United States Patent [19]
Fukushima et al.

[11] Patent Number: 6,123,569
[45] Date of Patent: *Sep. 26, 2000

[54] CHARGING CONNECTOR FOR ELECTRIC VEHICLE

[75] Inventors: Hirotaka Fukushima; Toshiaki Hasegawa, both of Shizuoka, Japan

[73] Assignee: Yazaki Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/760,422

[22] Filed: Dec. 4, 1996

[30] Foreign Application Priority Data

Dec. 6, 1995 [JP] Japan ................................ 7-317934

[51] Int. Cl.$^7$ .................................................. H01R 13/58
[52] U.S. Cl. ........................................... 439/456; 439/310
[58] Field of Search .................................. 439/456, 459, 439/310, 34, 447

[56] References Cited

U.S. PATENT DOCUMENTS

| | | | |
|---|---|---|---|
| 1,601,255 | 9/1926 | Marra | 439/447 |
| 2,223,231 | 11/1940 | Smith | 439/447 |
| 4,210,380 | 7/1980 | Brzostek | 439/456 |
| 5,244,415 | 9/1993 | Marsilio et al. | 439/456 |
| 5,332,397 | 7/1994 | Ingalsbe | 439/456 |
| 5,458,496 | 10/1995 | Itou et al. | 439/34 |

FOREIGN PATENT DOCUMENTS

| | | |
|---|---|---|
| DE-GM 1 797 809 | 8/1959 | Germany. |
| 92 15 169 U1 | 2/1993 | Germany. |
| 44 46 406 A1 | 7/1995 | Germany. |
| 57-128782 | 8/1982 | Japan. |
| 2205205 | 11/1988 | United Kingdom ............... 439/456 |

*Primary Examiner*—Gary F. Paumen
*Attorney, Agent, or Firm*—Armstrong, Westerman, Hattori, McLeland & Naughton

[57] ABSTRACT

A charging connector device for an electric vehicle is provided which includes a power receiving connector mounted on a vehicle body and a power supplying connector coupled or engaged with the power receiving connector. The power supplying connector includes a main cable path and a cable connecting portion. In the main cable path, a plurality of lead wires are arranged to be connected to a grounding terminal, a charging terminal and other terminals, and at least two wire securing shafts are provided for reducing tension exerted on the lead wires. Thus, a cable, connected to the power supplying connector, can be surely prevented from becoming disconnected from the power supply connector.

1 Claim, 12 Drawing Sheets

CHARGING CONNECTOR FOR ELECTRIC VEHICLE

BACKGROUND OF THE INVENTION

1. Field of the Invention

The present invention relates to a charging connector for an electric vehicle having a cable connected to a power supply connector, such that the cable can be surely prevented from being pulled out of the power supply connector.

2. Description of the Prior Art

An electric vehicle is charged by passing a current through a power receiving connector attached to a vehicle body, when the power receiving connector is coupled with a power supply connector which is, in turn, cable-connected to a charger. In this case, coupling and separation of the power supply connector from the power receiving connector can be repeated many times and a large current is passed through the cable. For this reason, if the cable comes off or is disconnected from the power supply connector during working or charging, an accident may result and lead to injury. Loosening of connection between a lead wire of the cable and a charging terminal may lead to wire-breaking or short-circuiting.

A structure for preventing loosening of the connection portion between such a lead wire and a terminal and for preventing the cable from being disconnected from a connector body is proposed in FIGS. 12(A) and (B) and 13(A) and (B) of J-UM-A-57-128782. In these figures, a denotes a multi-pole plug and b denotes a multi-pole connector to be coupled therewith. The multi-pole connector a includes: plug terminals connected to cords 71; a base 73, of thermoplastic hard resin, into which the plug terminals are inserted and secured; a plug intermediate body 75, connected to the base 73 by a screw 74; a thermosetting resin plug insulator 77, filled and sealed in the internal space from an opening 76 of the plug intermediate body 75, for serving to secure the members 71a for the connecting cords 71 and the plug terminals 72; and a thermoplastic body 78 having a cord protection portion 78a. A locking ring 79 is mounted on the base 73.

On the other hand, the multi-pole connector b includes: a flange receiving groove 80, into which a flange 73a of the base 73 is inserted; and the corresponding connector terminals 81. The multi-pole plug a and the multi-pole connector b are coupled with each other and locked to each other by the locking-ring 79.

In the multi-pole plug a shown in FIG. 12, the member 71a, for connecting the cords 71 and the plug terminals 72, are integrally molded by the thermosetting resin plug insulator 77. For this reason, there is no fear of the cords 71 either coming-off of or getting loosened from the connecting members 71a. Thus, the connecting member 71a is excellent at preventing the cords 71 from coming-off or loosening. However, it is difficult to apply the connecting member 71a to a charging connector of an electric vehicle, particularly a power supply connector, for the following reasons.

Since the power supply connector itself is considerably large, integral molding of its cable and members connected with the charging terminals by the thermosetting resin plug insulator 77 further increases the weight of the power supply connector. This is contradictory to demands for realization of a lighter weight power supply connector and makes it inconvenient to use the power supply connector.

Fixing the cords and the terminals by molding makes it impossible to rearrange or exchange the charging terminals and ground terminals. Where the terminals are abraded or damaged, the connector is obliged to be scrapped.

Further, in making the thermosetting resin plug insulator 77, it takes a long time to perform processing such as filling, sealing and hardening. This increases the production cost of the connector.

SUMMARY OF THE INVENTION

An object of the present invention is to provide a charging connector for an electric vehicle which is light in weight, which can freely allow rearranging or exchanging of terminals, which can be made at low cost, and which can prevent used cables from coming-off or detaching to increase safety.

In order to attain the above-described object of the present invention, a charging connector device is provided which is composed of: a power supply connector; and a power receiving connector. The power supply connector includes: a connector housing having a plurality of terminal chambers; and a case body connected to the connector housing. The case body includes a cable connection portion for a cable to be connected to a charger and main cable path communicating with the cable connection portion. The main cable path incorporates a plurality of lead wires to be connected to a grounding terminal and a charging terminal and other terminals located in the plurality of terminal chambers, and at least two wire fixing shafts located at a distance from one another for reducing tension applied to the plurality of lead wires, wherein when the power supplying connector and the power receiving connector are completely coupled with each other, electricity is turned-on.

In accordance with the present invention, since the lead wires are arranged in a state where they are pressed in a predetermined direction by two wire securing shafts, when tension acts on the lead wires from the side of the cable connecting portion, the tension is reduced because of frictional resistance at contact areas of the lead wires and the wire fixing shafts so that the tension does not directly act on the ground terminals and charging terminals, and the cable can be prevented from coming-off or disconnecting from the power supply connector.

The at least two wire securing shafts are preferably adapted to push the lead wires from opposite directions. Therefore, the lead wires themselves are secured in a bent state, and when tension acts on the cable, frictional resistance occurs to cancel the tension.

In addition to the above-described structure of the present invention, the case body preferably incorporates a wire holding shaft located in proximity to an opening of the terminal chamber for the grounding terminal in the main cable path for holding the lead wire to be connected to the grounding terminal at a central position of the opening. Because of such a structure, when a water proofing stopper, in intimate contact with the inner wall of the terminal chamber, is fit over this lead wire, the water proofing stopper will not make a stabilized waterproof sealing.

Further in the present invention, a cable protector is preferably provided. The cable is passed through the cable protector so as to have a grommet fit in the cable connecting portion. In addition, in this case, as preferable structure, a cable connecting portion has a tapered area on the side of its outlet and the grommet has a tapered tube for tightening the cable in cooperation with the tapered area, when tension acts on the cable. Because of such a structure, when tension acts on the cable, the tapered tube of the grommet is engaged with the tapered area of the cable connection portion so as to exert force in a tightening direction. The cable is secured at the grommet so that it is possible to prevent external force from being exerted on the inside of the case body.

In accordance with the present invention, resin molding is not adopted for securing the cables (and their lead wires) and charging terminals so that the resultant connector is relatively light in weight. The terminals can be rearranged or exchanged freely. The time taken for processing, such as resin hardening, can be saved. Thus, the connector can be made at a relatively low cost and the cables can be surely prevented from coming off or from disconnecting from the power supply connectors.

The above-described and other objects and features of the present invention will be more apparent from the following description taken in conjunction with the accompanying drawing figures.

BRIEF DESCRIPTION OF THE DRAWING FIGURES

DESCRIPTION OF THE PREFERRED EMBODIMENTS

Figure 1:
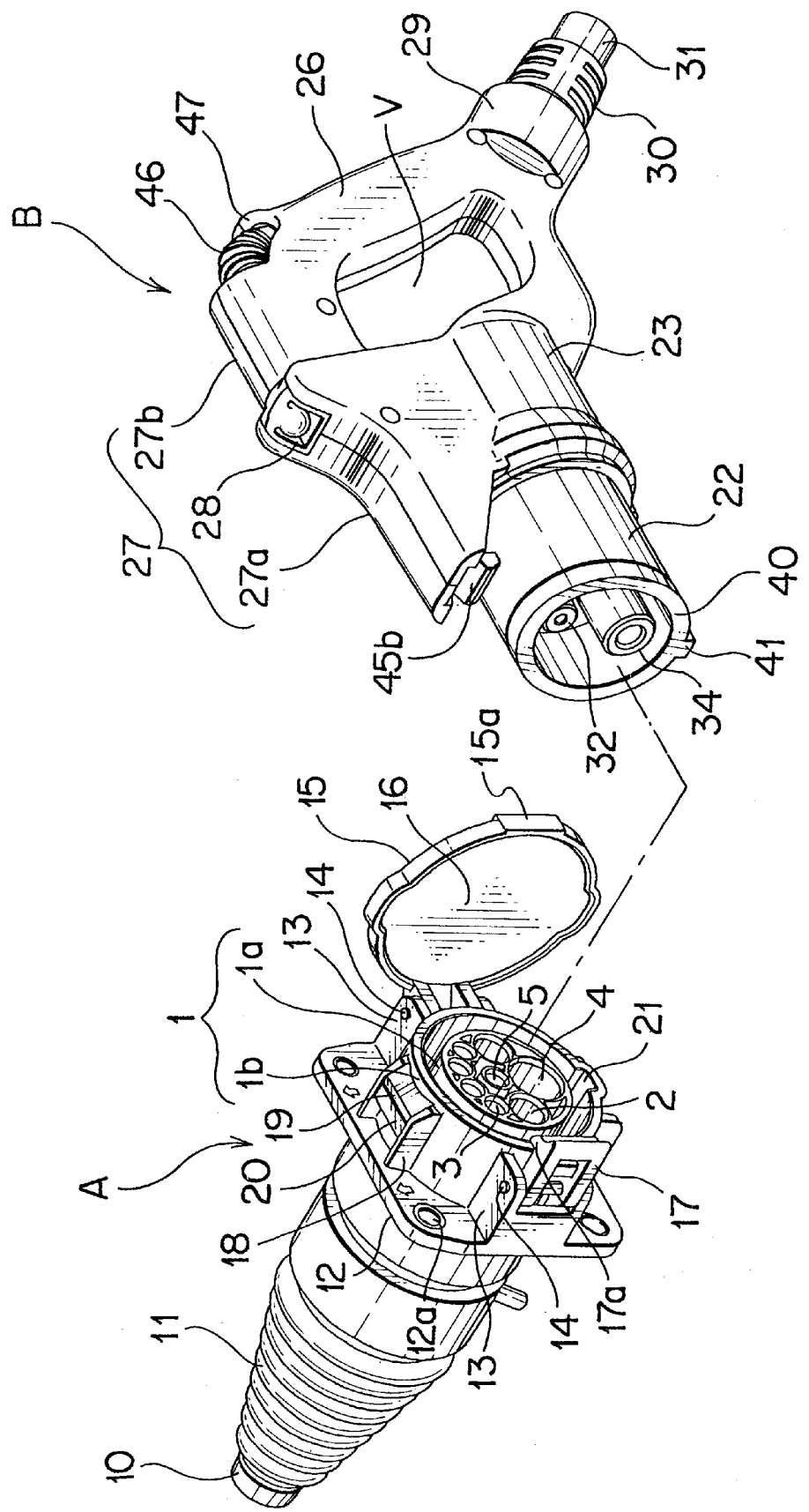
FIG. 1 is a perspective view of the first embodiment of a charging connector according to the present invention in a state where a power receiving connector and a power supply connector are disconnected.

Now referring to the drawing figures, an explanation will be given of embodiments of the present invention.

Figure 2:
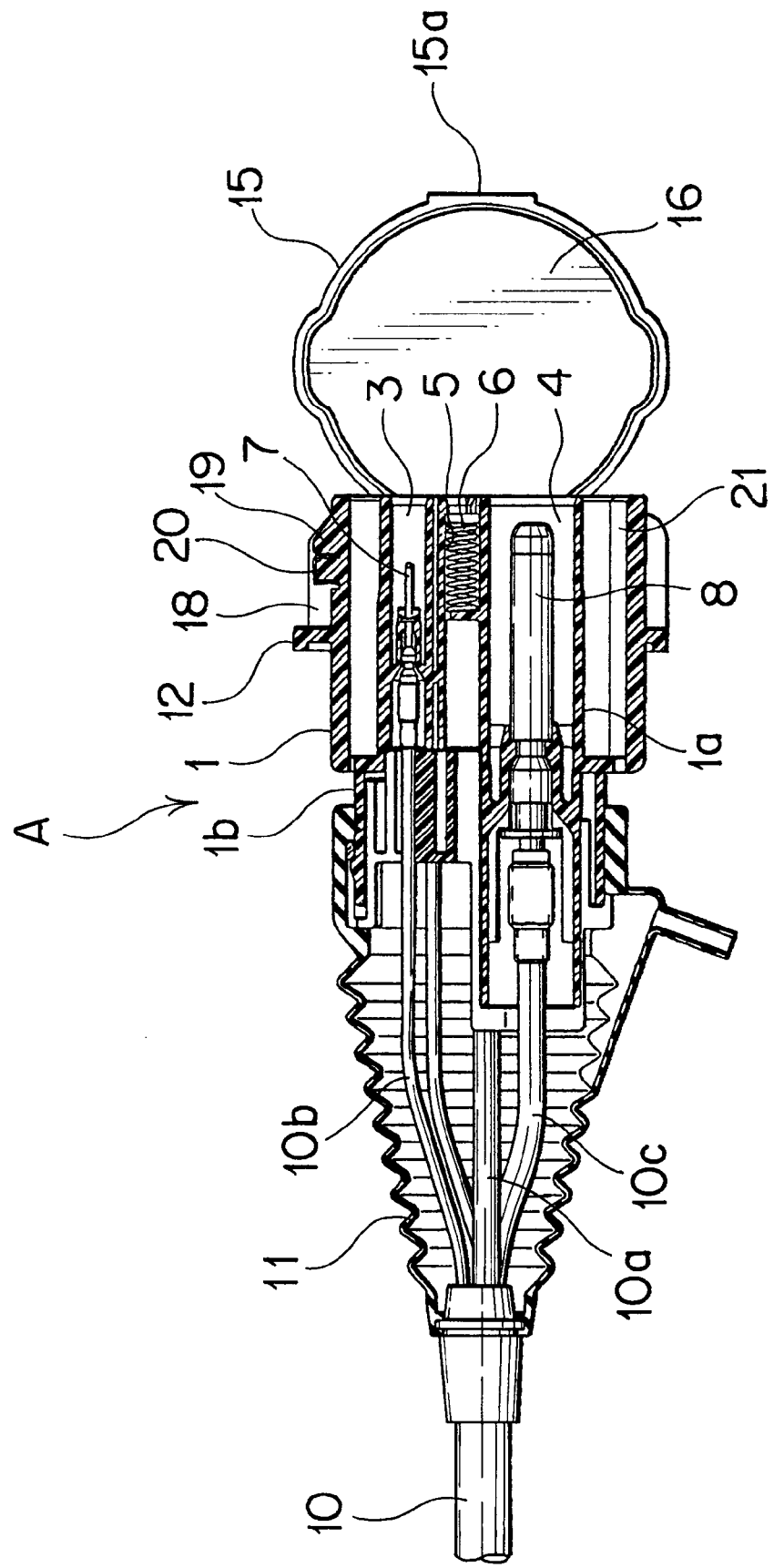
FIG. 2 is a longitudinal cross-sectional view of the receiving connector in FIG. 1.
Figure 3:
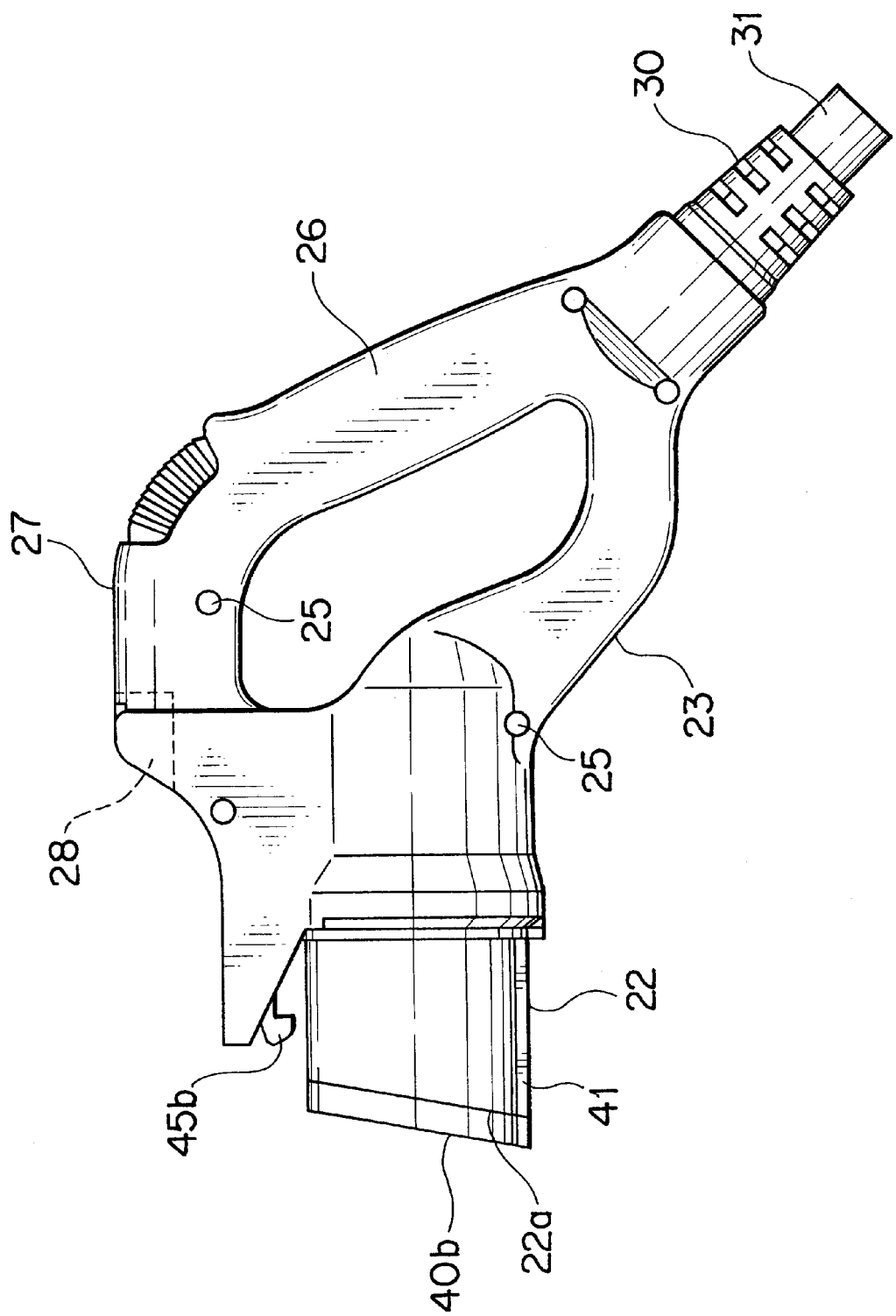
FIG. 3 is a front view of the power supply connector in FIG. 1.
Figure 4:
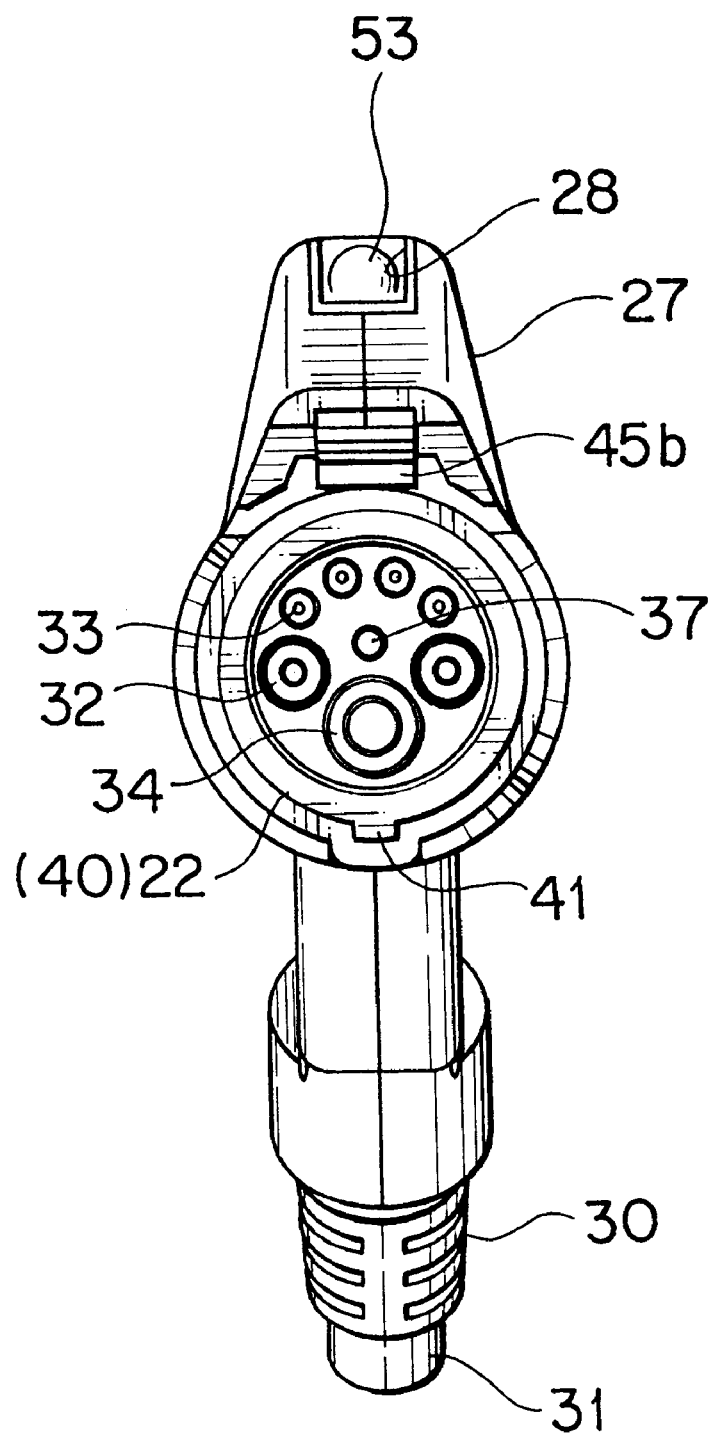
FIG. 4 is a left side view of FIG. 3.
Figure 5:
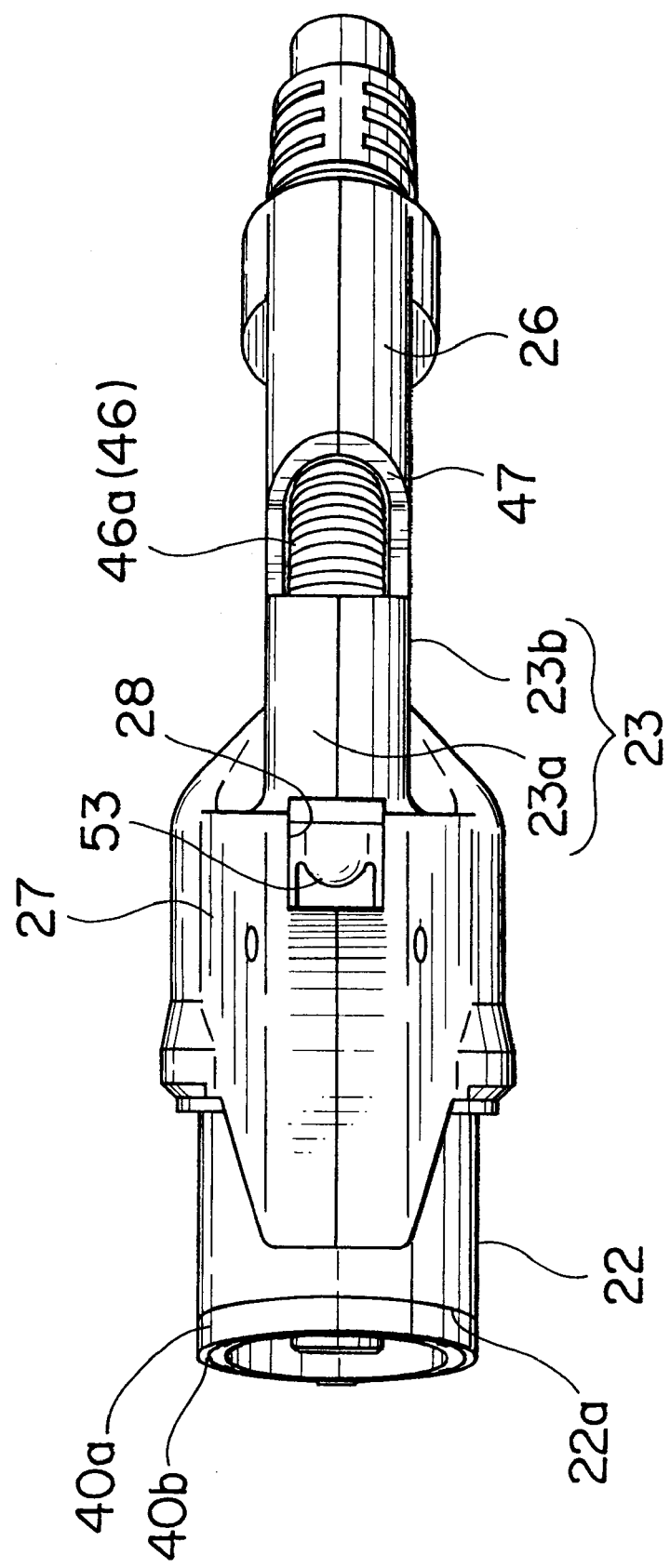
FIG. 5 is a plan view of FIG. 3.

In FIGS. 1 and 2, element A denotes a power receiving connector attached to a vehicle body and element B denotes a power supply connector.

In the power receiving connector A, a housing 1 is made of a synthetic resin insulating material, and is formed in a double-cylinder structure composed of an inner cylindrical housing 1a and an outer cylindrical housing 1b. Inside the inner housing 1a, plural terminal chambers 2, 3 and 4, which are cylindrical and which have different diameters, are individually located. At a central area, a spring chamber 5, incorporating a returning spring 6, is located. The returning spring 6 urges the power supply connector B towards a returning direction to promote separation of the connectors A and B. In the terminal chambers 2, 3, and 4, a charging male terminal (not shown) connected to a battery, a signal male terminal 7 for display and control of a charging state, and a grounding male terminal 8, are inserted, respectively. The respective male terminals are connected to lead wires 10a, 10b, and 10c of a cable 10 and extracted through a grommet 11 covered on the rear end of the outer housing 1b. The charging male terminal (not shown) has the same structure as that of the ground male terminal and is only slightly smaller than the ground male terminal. A flange 12, having bolt holes 12a, protrudes from the outer intermediate portion of the outer housing 1b, and is secured to the vehicle body. On both sides of the front of the flange 12, a pair of brackets 13 are positioned uprightly so as to intervene at the front half of the outer housing 1b. The one bracket is provided with a cap 15 which is openable/closable by a pin shaft 14, and the other bracket is provided with a locking piece 17 which is rotatable by another pin shaft 14. The cap 15 is provided with a receiving seat 15a to be engaged with an engagement piece 17a at the tip of the locking piece 17. The cap 15 is also equipped with a sealing packing 16 on its inner face. This permits dust proofing or water proofing during non-use. At the front half of the outer housing 1b, a securing piece 19, sandwiched between a pair of protection guide walls 18 and having a sloped front, is provided on its upper side, and a metallic enforcement piece 20, for preventing abrasion, is fit at the rear of the securing piece 19. On the lower side of the outer housing 1b, a guide groove 21, corresponding to a guide strip 41 of the power supply connector B, is made in a coupling direction.

In FIG. 1 and FIGS. 3 to 6, a case body 23 is coupled with the rear end of a connector housing 22 made of a synthetic resin insulator of the power supply connector B. The case body 23 is composed of a pair of division type cases 23a and 23b which are tightened by nuts 25 passing through screw passing holes 24 formed at the collating edges of the cases 23a and 23b. The case body 23 is coupled with a grip 26 through a space V at its rear, with a locking level chamber 27 having an illumination chamber 28 at its upper side and with a cable connection portion 29 at the rear of its lower side. The cable connection portion 29 is connected to a cable 31 through a cable protector 30.

Figures 6, 6A:
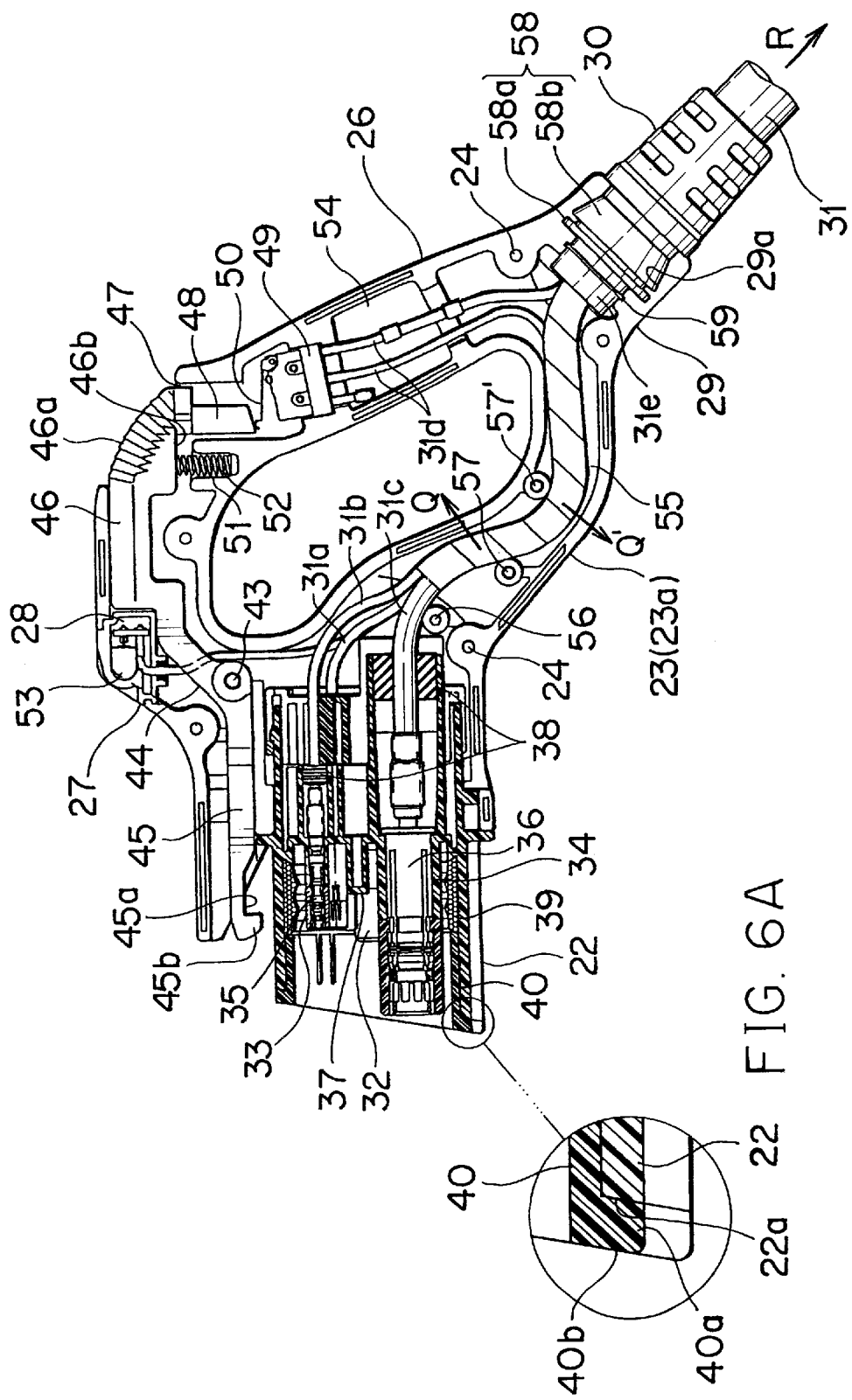
FIG. 6 is a longitudinal cross-sectional view of the power supply connector of FIG. 1.
Figure 7:
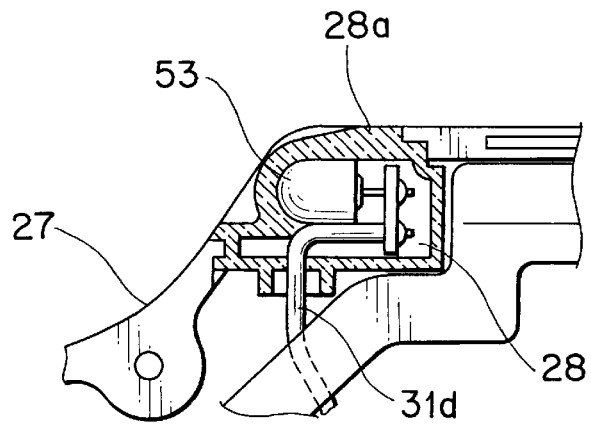
FIG. 7 is an enlarged view of an indicator in FIG. 6.

The connector housing 22 has a cylindrical shape. Its front end surface 22a, as seen from FIGS. 3 and 5, has an inclined-cut shape whose lower side is longer than its upper side. Terminal chambers 32, 33 and 34 are located inside of the connector housing 22 to be inserted into the terminal chambers 2, 3 and 4 of the power receiving connector A. The corresponding charging male terminal (not shown), signal female terminal 35 and grounding female connector 36 are inserted into the terminal chambers 32, 33, 34, respectively. A pusher 37, corresponding to the returning spring 6, protrudes from the center of the terminal chambers 32 to 34. As seen in FIG. 6, the front end of the grounding female terminal 36 and its terminal chamber 34 are formed to protrude more forwardly than the front end of the signal female terminal 35 and its terminal chamber 36 (and the charging female terminal and its terminal chamber 32). The lead wires 31a, 31b and 31c of the cable 31 connected to the respective female terminals, over which water-proofing stoppers 38 are fit to make individual water-proofing sealing for the respective terminal chambers, are arranged and secured within a main cable path 55 (described further below) of the case body 23.

The rear half of the inner face of the connector housing 22 is fit with a water-proofing packing 39 having a uniform width and the front half thereof is fit with a packing holder 40 made of metal such as iron and stainless steel. The packing holder may be made of reinforcement plastic having a large shock withstanding property. The packing holder 40, in accordance with the inclined front surface 22a of the connector housing 22, is formed to have a width gradually increasing from its top to its bottom. A ring-shaped convex portion 40a, formed on the outer peripheral surface, is fit to cover the front end surface of the housing 22 to protect and reinforce the tip of the connector housing 22. On the other hand, on the outer surface of the connector housing 22, a guiding protruding strip 41, corresponding to the guide groove 21, is formed on the lower side.

In the case body 23 of the connector housing 22, the upper lock lever chamber 27 is composed of a front chamber 27a and a rear chamber 27b. The illumination chamber 28, formed on the top of the chamber 27, is equipped with a two-color indicator lamp 53 of light-emitting diode or LED (described further below).

A locking lever 44 is rotatably supported by a shaft 43 at a central position inside the locking lever chamber 27. The locking lever 44 is made of metal, such as aluminum, iron, stainless steel, etc., similar to the packing holder 40, and includes an acting arm 45 at the front and an operating arm 46. The front end of the acting arm 45 protrudes from the front chamber 27a and is located in proximity to the outer wall of the connector housing 22. Inside the front end (i.e., on the side of the connector housing 22, a securing piece 45b is formed via a concave portion 45a. The rear end of the operating arm 46 extends to a window 47 which is opened into the upper side of the grip 26. A pressing portion 46a of the operating arm 46 is equipped with an embossing and is exposed. From a first end of the lower surface 46b of the pressing portion 46a, a pressing piece 48 extends into and protrudes from a path 54 of the grip 26. A lower end of the pressing piece 48 is in proximity to or in contact with a switch spring of a microswitch 49 having a normally closed contact. The second end of the lower surface 46b is urged upwardly by a coil spring 51 of a spring chamber 51 so that the acting arm 45 is always urged downwardly (i.e., toward the connector housing 22).

On the lower side of the case body 23, the pair of division type cases 23a and 23b form a main cable path 55 for the plural lead wires 31a, 31b, etc., constituting the cable 31 so as to communicate with the cable connection portion 29. From the main cable path 55, a wire holding shaft 56 protrudes in proximity to the rear end opening of the terminal chamber 34. The grounding terminal 36 is inserted into the rear end opening of the terminal chamber 34. The wire holding shaft 56 holds the lead wire 31c having the largest diameter connected to the grounding female terminal 36 at the center portion in the vicinity of the terminal chamber 34 so that the water proofing stopper 38 is not inclined to prevent the water proofing characteristic from being impaired.

The lead wire 31c, as well as the lead wires 31a and 31b, is tape-wound and secured by two wire securing shafts 57 and 57', for tension reduction, provided between the wire holding shaft 56 and cable connecting portion 29. Namely, the wire securing shafts 57 and 57' protrude toward the center of the path in opposite directions with a required interval from each other. The lead wires, such as the tape-wound lead wire 31a, are pressed by the wire securing shafts 57 and 57' in opposite directions indicated by arrows Q and Q'. Hence, the lead wires are fixed in a curved state within the main cable path 55. This prevents or relaxes direct application of tension from the outside.

These lead wires are externally extracted, together with the lead wire 31d of the microswitch 49, through a cable protector 30 fit in the cable connection portion 29. The cable protector 30 has a grommet 58 composed of a flange 58a and a tapered tube 58b successive thereto. The grommet 58 is fit in the cable connection portion 29 in such a manner that a C-shaped stopper ring 59 is fit over a terminal sheath 31e of the cable 31 extending from the flange 58a and the tapered tube 58b is conformed to the tapered portion 29a formed at the end of the main cable path 55, i.e. opening end of the cable connection portion 29. For this reason, even when the cable 31 is pulled in the directio of arrow R, the tapered tube 58b is tightened by the tapered portion 29a so that the cable 31 cannot loosen from or come off of the power supply connector.

Thus, because of the fixing/tightening force of the grommet of the cable protector 30, fit in the calbe connection portion 29, and the pressing/friction force in opposite directions of the wire securing shafts 57 and 57', external tension is not entirely or almost applied to the lead wires 31a, 31b, etc., of the cable 31 so that the cable 31 is prevented from loosening or coming off of the power supply connector. On the other hand, a clear case 28a is fit in the illumination chamber 28 at the upper side of the case body 23, and an indicator lamp 53 is set inside the clear case 28a. The indicator lamp 53 may be a two-color type LED device composed of two light-emitting diodes 53a and 53b as shwn in FIG. 8A. This LED is configured so that in standby mode, i.e., when the cablee 31 is connected to a charger C (FIG. 8B), the one LED 53a emits green, and in charging, the other LED 53a emits red.

The micro-switch 49, to be engaged with the pressing piece 48 of the locking lever 44, is connected to a control circuit (i.e., safety pilor circuit) 62 equipped with a switch 60 and relay 61 in the charger C. In operation, when the power receiving connector A and the power supply connector B are completely coupled with each other, the switch 60 turns on so that the relay operates. As a result, a current flows through the power supply circuit 63 (i.e., male and female terminals and lead wires 10a and 31a).

An explanation will be given of a method of using the power supply connector B.

Figure 8A:
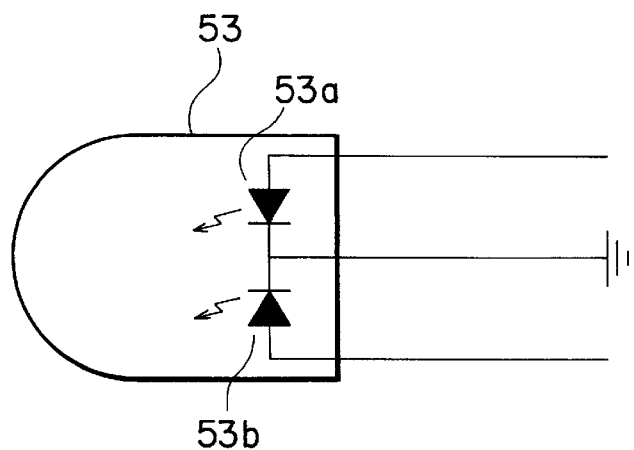
FIGS. 8A and 8B are circuit diagrams of an illumination circuit including the indicator lamp of FIG. 6.
Figure 8B:
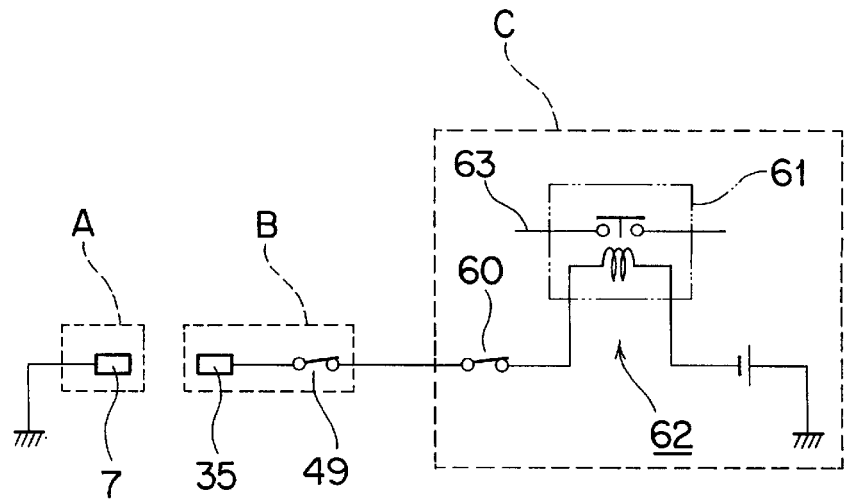

When the cable 31 is connected to the charger C as shown in FIG. 8B, the illumination circuit as shown in FIG. 8A causes the green light emitting diode 53a, of the indicator lamp 53 in the illumination chamber 28, to emit light. Thus, since the front surface and upper suface of the pwer supply connector B is illuminated with light, coupling of the connectors can be made in safety without missing a mark in the dark or at night.

In carrying the power supply connector B for coupling, it may slip from a hook or one's hand and thus, hit on the floor and ground. But, in such a case, since the front of the conenctor housing 22 is protected by the metallic packing holder 40, the entire power supply connector, inclusive of the case body 23, will not be damaged.

Next, the power supply connector B will be coupled with the power receiving connector A.

Since the front of the connector housing 22 (i.e., front 40b of the packing holder 40) in the connector B is slanted at an angle, with the grip 26 grasped by one's hand, the tip can be easily inserted into the gap between the outer housing 1b and inner housing 1a of the power receiving connector A. With the guiding strip 41 on the lower side in FIG. 1 aligned with the guide groove 21 of the connector A (FIG. 1), coupling of the connectors can be made smoothly.

Figure 9:
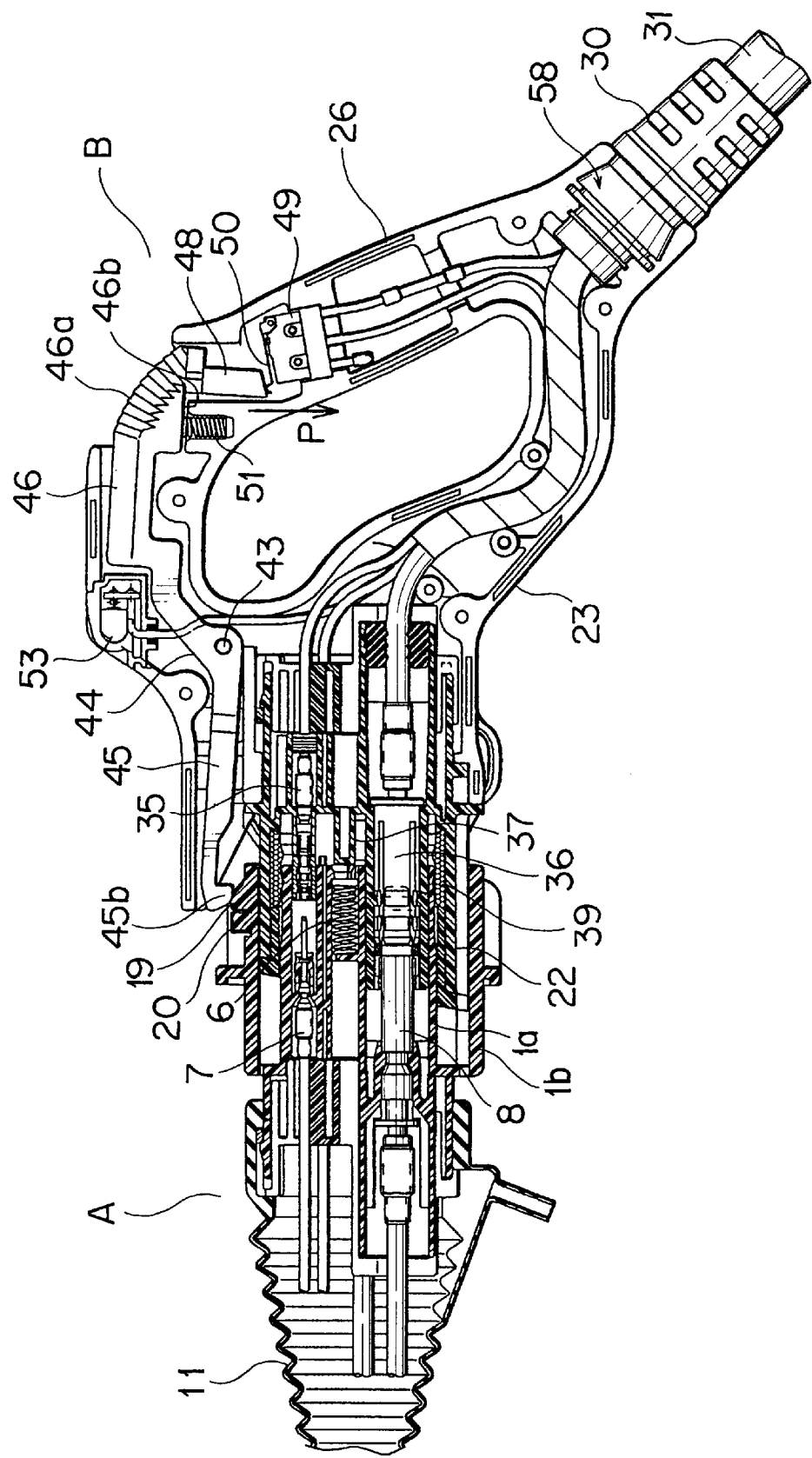
FIG. 9 is a cross-sectional view of the interim state of coupling the power supply connector and the receiving connector in FIG. 1.

FIG. 9 shows the interim state of coupling of the connectors A and B. In the interim coupling, the tip of the inner housing 1a of the power receiving connector A reaches the middle of the ring-shaped water-proof packing 39 in the power supply connector B. The returning spring 6 and pusher 37 are not yet brought into contact with each other. Therefore, the power supply connector B can be smoothly inserted into the power receiving connector A with very slight resistance. First, the grounding terminal 8 and the female terminal 36 are brought into contact with each other. Thus, the entire charging circuit is grounded so that both an electrical shock to a worker and damage to the connectors A and B from short-circuiting can be prevented.

At the same time as the grounding, the securing piece 45b at the front end of the front acting arm 45 of the locking lever 44 runs onto the front sloped surface of the securing protrusion 19 of the power receiving connector A. Thus, the rear operating arm 46 is presed down against the coil spring 51 as indicated by arrow P so that the pressing piece 48 presses down the switch spring 50 of the microswitch 49 having a normally closed contact. Then, the microswitch 49 is turned "off". Even when the switch 60 of the charger C is in the control circuit 62 in FIG. 8B is turned "on", the contact of the relay 61 is opened so that no current flows through the charging circuit 63.

Figure 10:
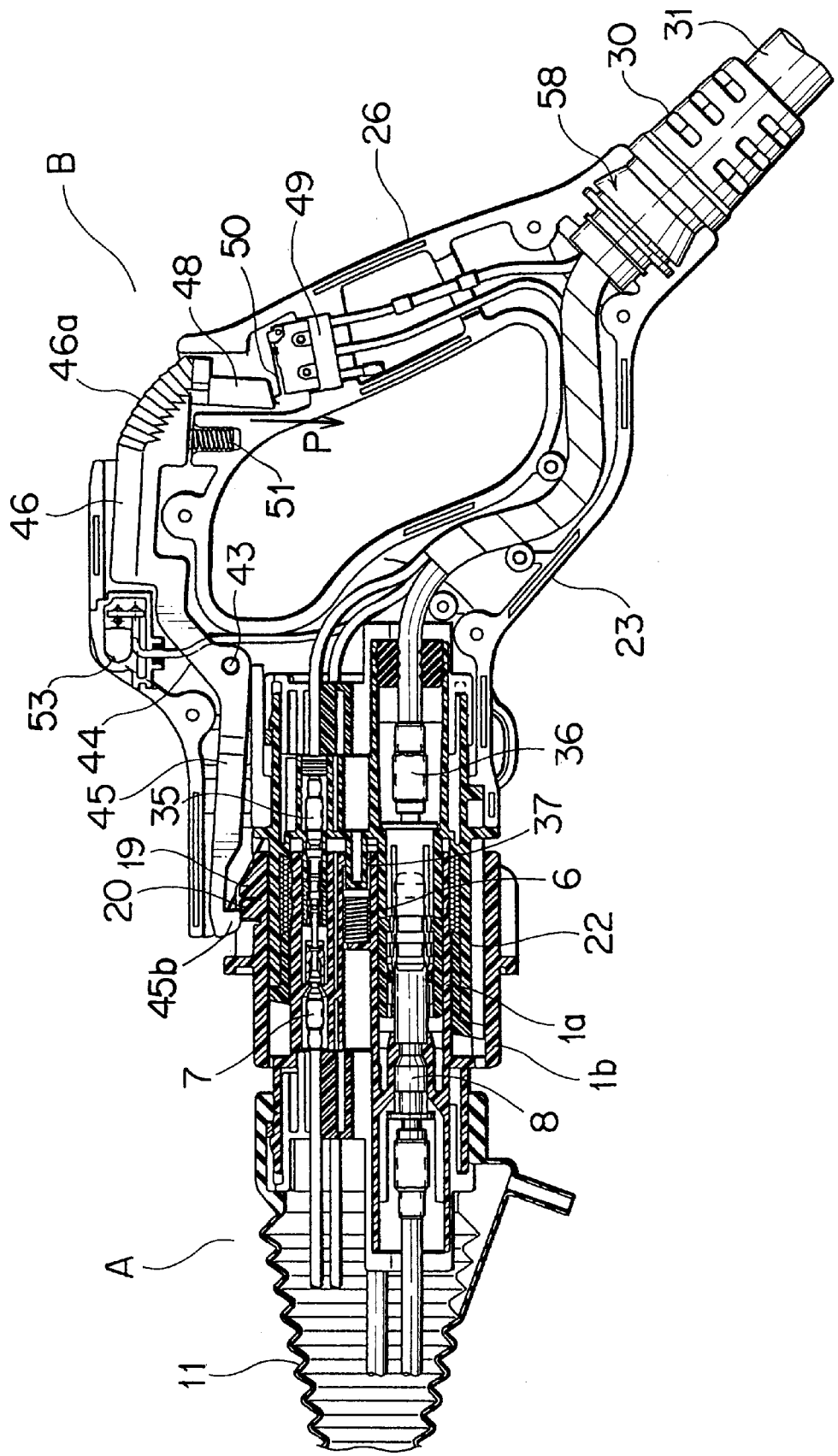
FIG. 10 is a cross-sectional view of the interim state successive to the state of FIG. 9.

FIG. 10 shows the interim coupling state at the next stage. When the power supply connector B is further inserted, the pusher 37 hits on the returning spring 6. Therefore, coupling of the pwer supply connector B with the connector A is carried out against the elastic force. As seen from FIG. 10, since the connection between the signal male terminal 7 and the signal female terminal 35 and the connection between the charging male terminal and charging female terminal are also started, the force required for coupling is increased. Since the securing piece 45b of the locking lever 44 is still on the rear of the securing protrusion, the microswitch 49 is still turned "off" and hence, no current flows through the charging circuit. When a workier detaches his hand from the connector B to stop the coupling operation in the state shown in FIG. 10, the connector B can be easily removed by the spring-back operation of the returning spring 6. By increasing the elasticity of the returning spring 6, the connector B can be returned to the semi-coupling state by its spring-back operation.

Figure 11:
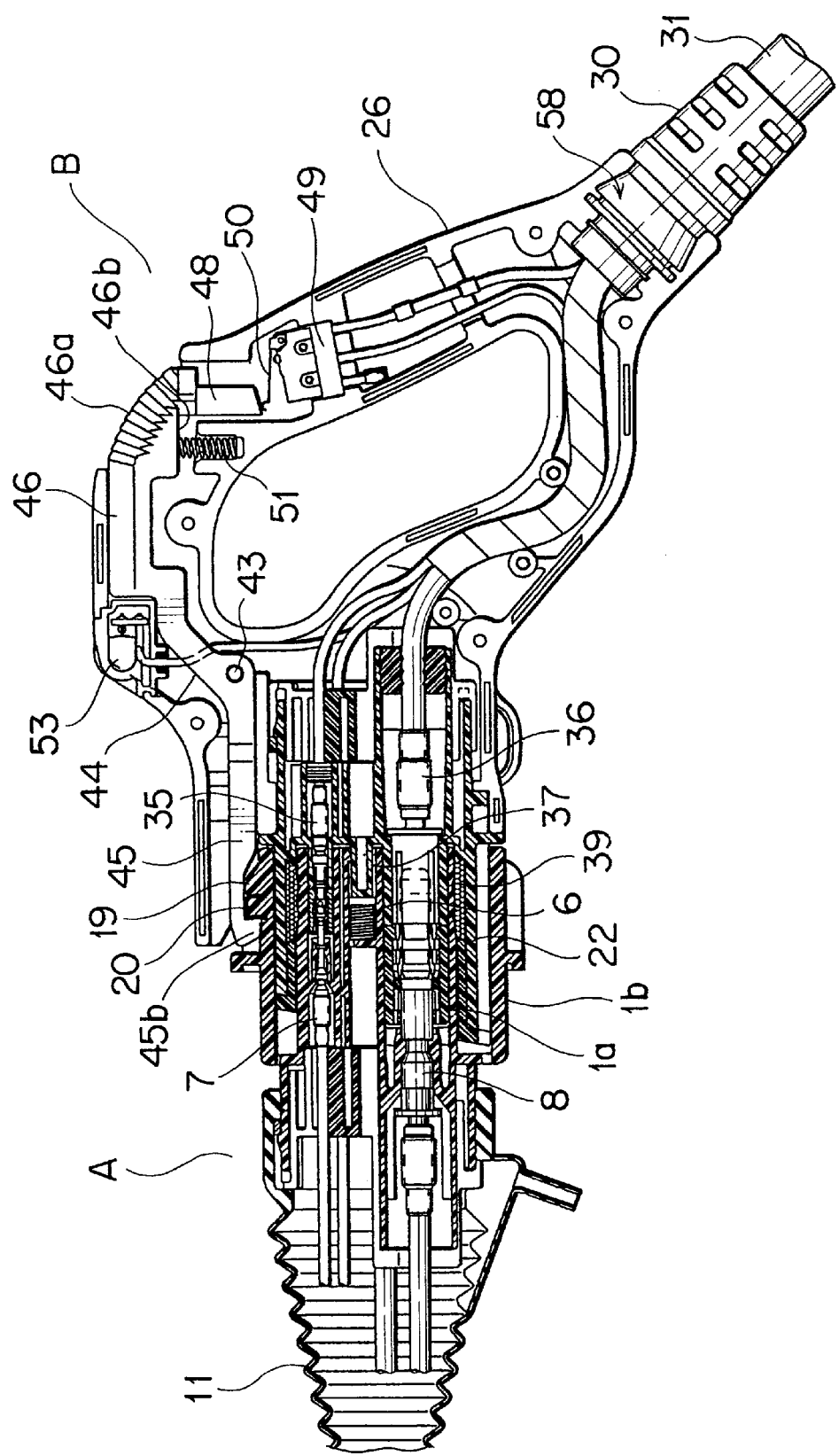
FIG. 11 is a cross-sectional view of the state of completion of the coupling.
Figure 12A:
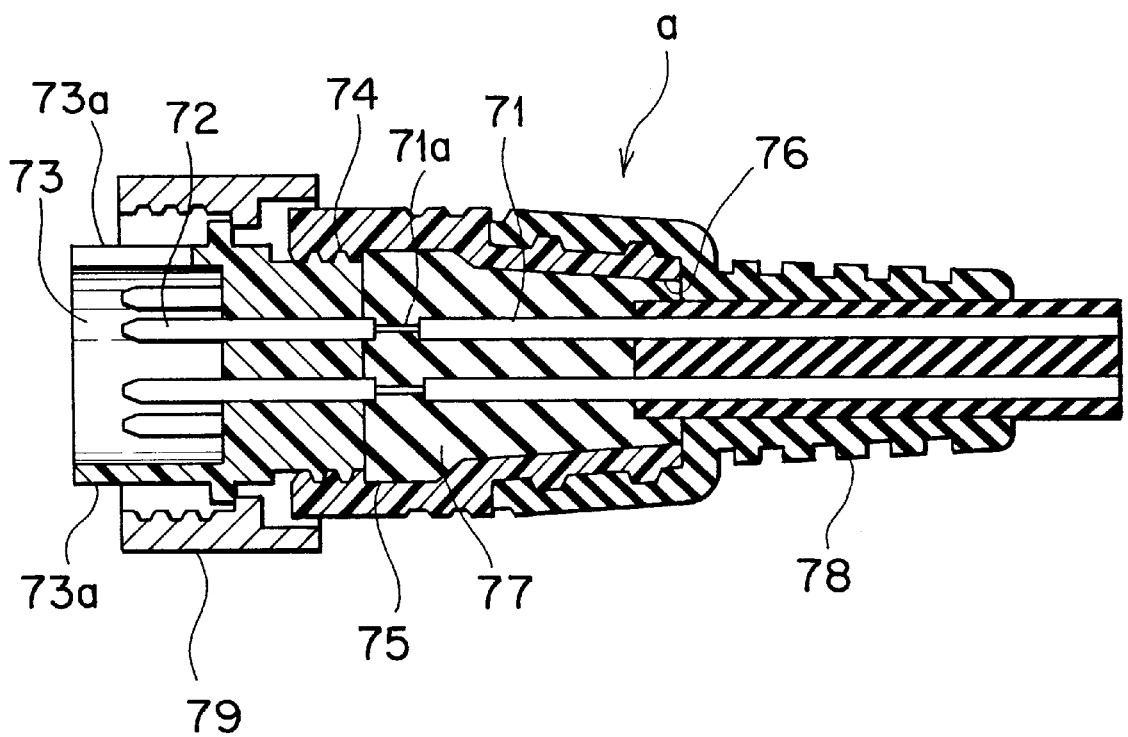
FIG. 12A is a cross-sectional view showing a conventional cable securing structure.
Figure 12B:
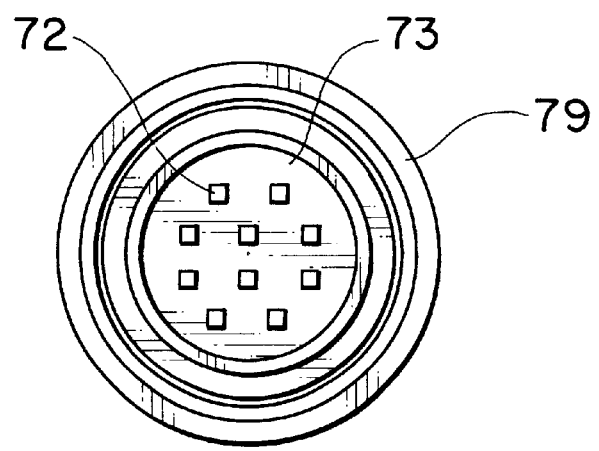
FIG. 12B is a front view of FIG. 12A.
Figure 13A:
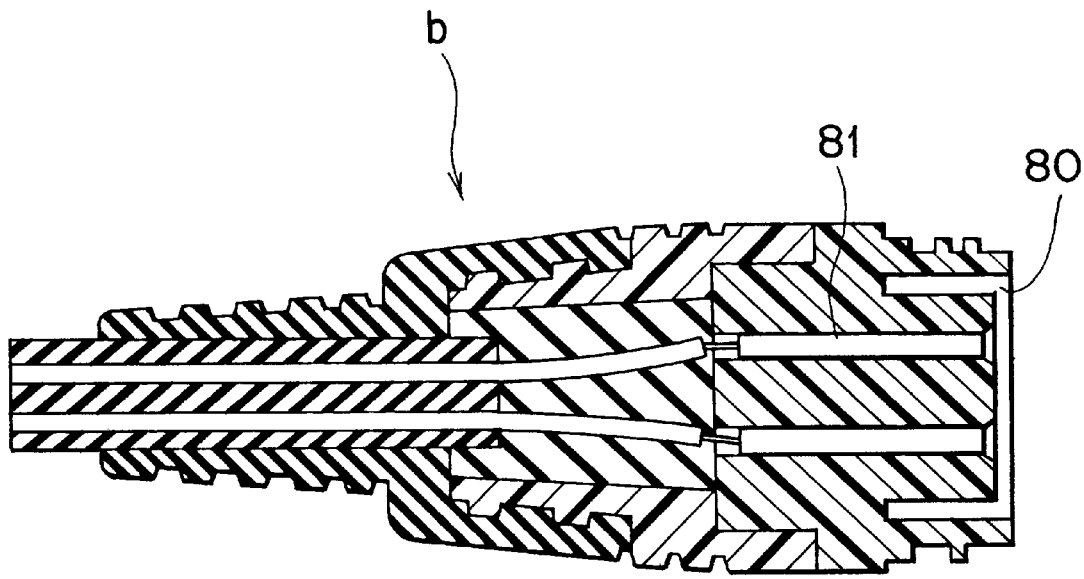
FIG. 13A is a cross-sectional view showing another conventional cable securing structure.
Figure 13B:
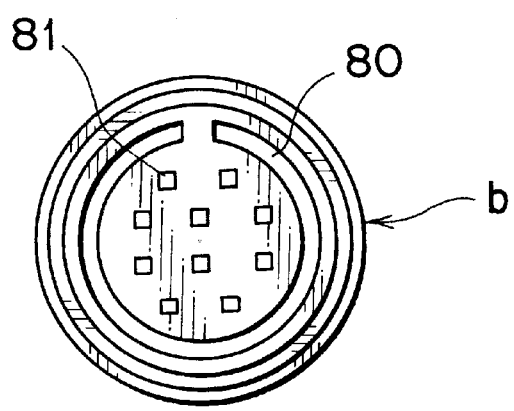
FIG. 13B is a front view of FIG. 13A.

FIG. 11 shows the complete coupling state of the connectors A and B. In the state shown in FIG. 10, when the connector B is pushed into the connector A against the elastic force of the returning spring 6, both connectors are completely coupled with each other. Specifically, the securing piece 45b overlaps the securing protrusion 19, and the locking lever 44 is elastically returned by the coil spring 51. Thus, the securing piece 45b is engaged with the rear face of the securing protrusion 19. Simultaneously, the male and female terminals for charging, the male and female terminals 35 and 7 for signal, and male and female terminals for grounding 36 and 8 are completely connected to each other. The elastic return of the locking lever 44 releases the pressing-down of the switch spring 50 by the pressing piece 48 so that the microswitch 49 is turned "on". Thus, in the control circuit 62 in FIG. 8B, the contact of the relay 61 is closed so that the charging circuit 63 turns on the electricity or is energized, thus starting charging.

As described above, only when the power receiving connector A and the power supply connector B is in a complete coupling state as shown in FIG. 11, the control circuit 62, i.e., the safety pilot circuit, is turned "on", thus allowing charging. In the interim coupling state shown in FIG. 9 or 10, the control circuit 62 is turned "off", similar to before coupling, so that charging will not be carried out in an unstable state.

Further, removal (i.e., release of coupling) of connector A from connector B can be done very easily. Specifically, after completion of charging, when the pressing portion 46a of the oerating arm 46, exposed from the window of the grip 26, is pushed down by e.g., one's thumb, the forward acting arm 44 can be easily lifted by leverage on the supporting point of the shaft 43 so that the engagement of the securing piece 45 and the securing protrusion 9 is released. Thus, a pushing-back force by the returning spring 6 is applied to the connector B through the pusher 37 to that the connector B can be easily separated from the connector A by a samll force. During the separation process, the microswitch 49 is in a turned "off" state, similar to during the interim coupling, so that the charging circuit 63 is not energized.

What is claimed is:

1. A charging connector device for an electric vehicle, said charging connector comprising:

a power supply connector, wherein said power supply connector includes a connector housing having a plurality of terminal chambers and a case body connected to said connector housing, said case body including a cable connection portion for a cable to be connected to a charger and a main cable path communicating with said cable connection portion, said main cable path incorporating a plurality of lead wires wrapped together in a bundle for at least a portion of their lengths, said plurality of wrapped lead wires to be connected to a grounding terminal and charging terminal and other terminals located in said plurality of terminal chambers, and at least two wire securing shafts located apart from one another for reducing tension applied to said plurality of wrapped lead wires, said at least two wire securing shafts being arranged on opposite sides of said plurality of wrapped lead wires, one after the other, and said cable connecting portion has a tapered area on a side of an outlet thereof and said grommet has a tapered tube for tightening said cable in cooperation with said tapered area when tension acts on said cable;

a power receiving connector, wherein said power supplying connector and said power receiving connector are completely coupled with each other so as to turn-on a supply of electricity to said charging connector device; and a cable protector through which said cable is passed having a grommet fit in said cable connecting portion; and a wire aligning shaft in said case body located in proximity to an opening of said terminal chamber for said grounding terminal in said main cable path for aligning one of said plurality of lead wires to be connected to said grounding terminal at a central position of said opening by straightening said lead wire after it leaves said at least two wire securing shafts prior to entry into said terminal chamber.

* * * * *